(12) United States Patent
Hao et al.

(10) Patent No.: US 7,272,163 B2
(45) Date of Patent: Sep. 18, 2007

(54) METHOD FOR TWO-LEVEL VARIABLE CHIP RATE SPREADING AND DESPREADING USED IN CDMA SYSTEM

(75) Inventors: Li Hao, Sichuan Province (CN); Pingzhi Fan, Sichuan Province (CN)

(73) Assignees: The Research Institute of Telecommunications Transmission, Beijing (CN); Southwest Jiao Tong University, Sichuan Province (CN)

( * ) Notice: Subject to any disclaimer, the term of this patent is extended or adjusted under 35 U.S.C. 154(b) by 605 days.

(21) Appl. No.: 10/084,241

(22) Filed: Feb. 27, 2002

(65) Prior Publication Data
US 2002/0154680 A1    Oct. 24, 2002

(30) Foreign Application Priority Data
Feb. 28, 2001    (CN) .................................. 01 1 09301

(51) Int. Cl.
*H04B 1/707*    (2006.01)
(52) U.S. Cl. ...................................................... 375/141
(58) Field of Classification Search ................ 375/141, 375/140, 145–147, 149
See application file for complete search history.

(56) References Cited
U.S. PATENT DOCUMENTS

| | | | | |
|---|---|---|---|---|
| 5,103,459 A | * | 4/1992 | Gilhousen et al. | 370/206 |
| 5,414,728 A | * | 5/1995 | Zehavi | 375/142 |
| 5,416,797 A | * | 5/1995 | Gilhousen et al. | 370/209 |
| 5,533,012 A | * | 7/1996 | Fukasawa et al. | 370/342 |
| 5,950,124 A | * | 9/1999 | Trompower et al. | 455/422.1 |
| 6,088,347 A | * | 7/2000 | Minn et al. | 370/342 |
| 2001/0053178 A1 | * | 12/2001 | Yano et al. | 375/150 |
| 2002/0003842 A1 | * | 1/2002 | Suzuki et al. | 375/259 |

FOREIGN PATENT DOCUMENTS

WO    WO0045530 A1 *  3/2000

\* cited by examiner

*Primary Examiner*—Don N. Vo
(74) *Attorney, Agent, or Firm*—Patterson, Thuente, Skaar & Christensen, P.A.

(57) ABSTRACT

This invention involves a two-level variable chip rate spreading and despreading method used in CDMA systems. The total spreading gain is the product of the two level spreading factors. Orthogonal sequences, ZCZ sequences and Pseudo-Noise (PN) sequences can be employed as the first- and second-level spreading codes. By employing the two-level spreading method, the interference existing in the systems can be suppressed efficiently and the system performance can be improved significantly.

13 Claims, 3 Drawing Sheets

METHOD FOR TWO-LEVEL VARIABLE CHIP RATE SPREADING AND DESPREADING USED IN CDMA SYSTEM

BACKGROUND OF THE INVENTION

1. Field of the Invention

The present invention relates to a method for two-level variable chip rate spreading and despreading used in CDMA (Code Division Multiple Access) system.

2. Description of the Prior Art

In CDMA system, many users share the same frequency band and time slot. Multiple access transmission can be implemented through the allocated spread sequence, i.e. the address code. In this case, the interference acting on user receivers in the system generally comprises channel noise, self-interference (SI) caused by a user signal multipath transmission, multiple access interference (MAI) caused by the other users in a cell, and adjacent cell interference (ACI) caused by users in adjacent cells. In ideal case, spreading code sets used in CDMA system should have the following correlation properties: the autocorrelation function of each spreading sequence code is an impulse function, that is, the value should be zero at passim except the zero time delay. The value of the cross correlation function for each pair of spreading sequence codes should be zeros passim. In this case, there is only channel noise in the system. Although it has been proved that the spreading sequence code sets having such ideal correlation properties do not exist, however, except the first kind of channel noise, the rest three kinds of interference can be effectively suppressed by selecting a appropriate address code and a spreading method, thereby a better system performance can be achieved.

In terms of the existing CDMA systems, a two-layer spreading method is generally employed. In a downlink, the first layer spreading uses an orthogonal code such as Walsh sequence (e.g. IS-95, TD-SCDMA, CDMA2000, etc) or OVSF (orthogonal variable spreading factor) sequence (e.g. WCDMA) as the spreading address codes (i.e., channel code) so as to distinguish channels in a cell and suppress interference from other users within the cell. The second layer spreading uses generally PN (pseudo-random) sequence such as m sequence (for example, IS-95, CDMA 2000) and Gold sequence (for example, WCDMA) as an address code (i.e., scrambling code) so as to distinguish the channels of different cells. Similarly, in an uplink, such a two-layer spreading method comprising of orthogonal sequence and pseudo-random sequence (WCDMA, TD-SCDMA, etc) can also be used. However, the orthogonal sequence sets can be used only in different channels of the same user and the pseudo-random sequences for each of users within the same cell should be different. The characteristics of the conventional two-layer spreading method are in that the chip rate has already reached the chip rate required by the system after it has been spread with the first layer orthogonal channel code. The second layer spreading is just an XOR operation of the chips come through the first layer spreading and scrambling chips with the same rate, the chip rate is not changed and the spreading is not executed. In other words, the scrambling code of the second layer is only used as an address code and it plays no role in spreading. Such a two-layer method has advantages of which the match of the channel code and the scrambling code increases the number of available channels in the system, MAI (from other users in downlinks and from other channels of the same user in uplinks) on same path can be removed completely with the orthogonal properties of the orthogonal code, PN sequence can randomize the interference from other paths and other cells (in the case of uplinks, it is users), and give rise to greater system gain.

It can be seen from above description, the purpose for the use of orthogonal sequence in CDMA system is to maintain the orthogonalilty of the user signals so as to suppress interference. However, in practice, the improvement of performance produced by the orthogonal sequence is limited because the synchronization may be destroyed by the influence of the transmission or channels. In terms of downlinks, the useful signals which are received by the mobile station receiver are naturally synchronized with the interference from the users of the same cell, therefore, such a destruction usually results from multipath propagation. Especially, when the number of fingers of a RAKE receiver is smaller than that of multiple paths of a propagation channel, the system performance degradation due to such destruction will be worse. In reverse links, even if a special synchronous signal (or channel) is sent, because of the different distances between mobile stations and the base stations, the time that the signals arrived at the base stations is different. Based upon the reasons mentioned above, in the reverse links of most systems, different users use different PN sequences, while the same PN sequence and different orthogonal sequence are employed between the different channels of the same user. Similar to the case of downlinks, although the different channel signals of the same user are naturally synchronized, their orthogonality is still subject to the influence of multipath propagation.

In order to solve the problem which the orthogonality of orthogonal sequence is destroyed by synchronous error, Chinese Patent Application No. 00103282.8 proposes a sequence which has a certain width for zero correlation zone (ZCZ), hereinafter refer to it as ZCZ sequence, in the vicinity of zero time delay. ZCZ is used as an address code in CDMA system. Interference can be effectively suppressed as long as the time delay offset between the useful signals and the interference signals is limited within the zero correlation zone Z because the autocorrelation function and cross correlation function of ZCZ sequence remains zero in a certain area. At this time, interference can not be completely removed because the magnitude of the interference depends on the partial correlation property of the sequence rather than on the periodic correlation property of the sequence. Therefore, in Chinese Patent Application No. 00103282.8, an additional guard chip is added into the spread signal so as to ensure the cycle zero correlation property to be available. Through simulation and analysis, it indicates that a good system performance can be still achieved even if guard chip is not added because the partial correlation property of ZCZ sequence in zero correlation zone is also excellent. Thus, for downlinks, all the multipath components which time delays are smaller than Z can be effectively suppressed. In uplinks, when the radius of a cell is small (for example, microcell system), as the non-synchrony caused by the distance can be controlled within several chips, the system which meets such a requirement of synchrony is referred to as quasi-synchronous system. For a quasi-synchronous system, as long as the delay does not exceed the zero correlation zone Z of ZCZ, the interference among the users using different ZCZ sequences can still be effectively suppressed. Therefore, interference in the system can be effectively suppressed by using ZCZ sequence as spreading address code, and a good system error code performance can be achieved.

According to above analysis, system performance can be improved by using ZCZ sequence as an address code in a quasi-synchronous system. However, because the second layer spread spectrum uses pseudo-random sequence as the interference code, if the channel code in the current CDMA system is replaced by ZCZ sequence in order to provide channel division between cells, the action of the zero correlation zone of ZCZ can not be shown when signals between the users are non-synchronous due to multipath or transmission. In this case, only the zero correlation property at the zero time delay can be used. At that time, ZCZ sequence functions just as a general orthogonal sequence, and the full potential of zero correlation zone of ZCZ sequence is not exerted.

SUMMARY OF THE INVENTION

The objective of the present invention is to provide a two-level spreading method which can make the most use of the property of zero correlation zone of ZCZ sequence to suppress interference in CDMA system.

The two-level spreading method according to the invention can be used for uplinks and downlinks of quasi-synchronous system respectively to divide channels and carry out multipath communication. In this invention, the first level spreading sequence (referred as to common code) is used to distinguish the users in different cells, and the second level spreading sequence (referred to as channel code) is used to distinguish the channels within a cell.

As the scrambling code which provides the division of cells (or users) in conventional two layer spreading method is of benefit to suppress multipath and intracell interference, according to the spreading method of this invention, the common codes which provide the division of cells can also suppress multipath and intracell interference within cells.

First, first level spreading is applied to the data output from the sending end by using the common code P, after that, the rate of the spread chip is $r_{c1}=L_1 r_b$, where $r_b$ is the bit transmission rate, and $L_1$ is the first level spreading factor. Then second level spread is applied to the output chip undergone first level spread by using channel code W. The rate of the output chip is $r_{c2}=L_2 r_{c1}$, where $L_2$ is the second spreading factor. After spreading twice, the total spreading factor is $L=L_1 \times L_2$. FIG. 1 shows the configuration of the chip data information bit $b^{k,c}$ undergone above mentioned two-levels spreading, where $p^c_n$ represents the nth chip for the cth common code $p^c$, $w^k_n$ represents the nth chip for the kth channel code $W^k$, $T_{c1}$ and $T_{c2}$ are the chip intervals after undergone the first and second level spreading respectively, $T_b$ is the data bit period, where $T_b = L \times T_{c2} = L_1 \times T_{c1}$.

It is assumed that the signal received by the ith user receiver in the $0^{th}$ cell contains the synchronized useful signals and interference signals, which is delayed for $1T_{c2}$, from the kth user in the cth cell and $1 \leq L_2$. In general, we take into account the $0^{th}$ data bit $b^{i,0}(0)$ and suppose the chip waveform is a square pulse, as shown in FIG. 2. First, despreading is executed with the local channel code $w^i$. The useful signal output, which obtained from the chips as shown in FIG. 3, on the nth common chip in the 0th data bit is expressed, $$(d^1)_n = b^{i,0}(0) T_{c2} P^0_n \sum_{m=0}^{L_2-1} W^i_m W^i_m = b^{i,0}(0) T_{c1} P^0_n$$

The interference on the nth common code chip caused by the kth user of the cth cell can be expressed as:

when n=0, $$(I^1)_n = T_{c2}\left\{b^{k,c}(-1)P^c_{-1}\sum_{m=0}^{l-1} W^i_m W^k_{m-l} + b^{k,c}(0)P^c_0 \sum_{m=l}^{L_2-1} W^i_m W^k_{m-l}\right\}$$

$$= T_{c2}\{b^{k,c}(-1)P^c_{-1}C_{k,i}(l-L_2) + b^{k,c}(0)P^c_0 C_{k,i}(l)\}$$

when $n > 0$, $$(I^1)_n = T_{c2} b^{k,c}(0)\left[P^c_{n-1}\sum_{m=0}^{l-1} W^i_m W^k_{m-l} + P^c_n \sum_{m=l}^{L2-1} W^i_m W^k_{m-l}\right]$$

$$= T_{c2} b^{k,c}(0)[P^c_{n-1} C_{k,i}(l-L_w) + P^c_n C_{k,i}(l)]$$

where $b^{i,0}(0)$ represents the 0th data bit, $b^{1,0}(-1)$ represents the previous data bit, while following equation is the partial correlation function of the channel code $W^k$ and $W^i$, $$C_{k,i}(l) = \begin{cases} \sum_{m=0}^{L_2-l-1} a^{(k)}_m a^{(i)}_{m+l}, & 0 \leq l \leq L_2 \\ \sum_{m=0}^{L_2-l-1} a^{(k)}_{m+l} a^{(i)}_m, & 1-L_2 \leq l < 0 \end{cases}$$

the code length of the channel code is $L_2$, and n=0 represents the first common code chip in each of data bits. It can be seen that the magnitude of the interference depends mainly on the quality of the partial correlation function of the channel codes after the channel code is despread.

The signals which have been despread with the channel code are further despread with the local common code $p^0$, the useful signal output on the 0th data bit can be expressed as:

$$d = \sum_{n=0}^{L_1-1} (d^1)_n P^0_n = b^{i,0}(0) T_{c1} \sum_{n=0}^{L_1-1} P^0_n P^0_n = b^{i,0}(0) T_b$$

and the interference is $$I = \sum_{n=0}^{L_1=1} (I^1)_n P^0_n = T_{c2}[b^{k,c}(-1)P^c_{-1} C_{k,i}(l-L_2) + b^{k,c}(0)P^c_0 C_{k,i}(l)]$$

$$P^0_0 + T_{c2} b^{k,c}(0) \sum_{n=1}^{L_1=1} [P^c_{n-1} C_{k,i}(l-L_2) + P^c_n C_{k,i}(l)]$$

$$P^0_0 \approx T_{c2} b^{k,c}(0)[C_{k,i}(l-L_2)\theta^p_{c,0}(-1) + C_{k,i}(l)\theta^p_{c,0}(0)]$$

where $$\theta^p_{c,0}(l) = \sum_{n=0}^{L_1=1} P^c_n P^0_{n+l}$$

is the periodic correlation function of the common codes $p^0$ and $p^c$. At that time, it is assumed that the code length of the common codes is $L_1$. The reason for using the approximate symbol is that the condition for n=0 is replaced by the condition for n≠0, and when $L_1 \gg 1$, such a approximation is tenable. It can be seen that the magnitude of the interference after being despread with the common code depends on both the partial correlation function of the channel code and the periodic correlation function of the common codes outside of time delay 0 and 1.

According to above analysis, it can be seen that ZCZ sequence can effectively suppress the interference no matter whether it is used as channel codes or common codes, and the system performance can be improved.

First, it takes into account the case where both channel code and common code use ZCZ sequence. If ZCZ sequence which zero correlation zone is 1 is selected as the common code, because when $|l| \leq 1$, $\theta^p_{c,0}(1)=0$, where $c \neq 0$, at that time, the interference from the users of other cells is completely removed and the interference is only from the users of the same cell. While the interference from the same cell is also effectively suppressed because $\theta^p_{c,0}(-1)=0$, thus when ZCZ sequence in which Z is 1 is used as the common codes, the interference which acts on the user can be expressed as:

$$\sum_{k=0, k \neq 1}^{K-1} L_1 T_{c2} b^{k,0}(0) C_{k,i}(l)$$

in which $K_0$ is the number of users in the 0th cell, it can be seen that the magnitude of the interference depends mainly on the quality of the cross correlation function of the channel code. Thus, as long as an appropriate ZCZ sequence is chosen as the channel code to make the delay 1 of the interference signals with respect to the useful signals to be limited within the zero correlation zone, the partial correlation function of the channel code will have satisfactory properties. At that time, the magnitude of the interference in the system can be effectively suppressed.

Further, ZCZ (orthogonal) sequence in which Z is 0 can also be used. At that time, interference from adjacent cells can not be removed completely. The interference from cell c ($c \neq 0$) can be expressed:

$$\sum_{c=1}^{N_c-1} \sum_{k=0}^{K_c-1} T_{c2} b^{k,c}(0) C_{k,i}(l-L_2) \theta^p_{c,0}(-1)$$

in which $N_c$ is the number of the cells and $K_c$ is the number of users in cell c. Interference from cell 0 can be given by $$\sum_{k=0, k \neq 1}^{K_0-1} T_{c2} b^{k,c}(0) [C_{k,i}(l-L_2) \theta^p_{0,0}(-1) + C_{k,i}(l) L_1]$$

On one hand, the magnitude of the interference depends on the partial correlation property of the channel codes, on the other hand, on the periodic cross correlation and autocorrelation properties of orthogonal sequence, which uses as common codes, at the time when the delay is 1. Since ZCZ sequence used as the channel codes has good partial cross correlation and autocorrelation properties, the interference can be effectively suppressed. Although the system performance is somewhat affected, the number of available common codes is twice as many.

Furthermore, in the case where ZCZ sequence is used as channel codes, pseudo-random sequence could be used as common codes at the same time. In this case, since PN sequence is a long code, therefore the correlation function of common codes in above expression related to interference should be a partial correlation function rather than a cycle correlation function. At that time, since ZCZ sequence has a good zero correlation zone, and PN sequence has pseudo-random property, the interference in the system can still be effectively suppressed and a good system performance can still be achieved.

In the case where ZCZ sequence in which zero correlation zone is 1 is used as common codes, the orthogonal sequence can also be used as the channel codes in order to increase the number of users in the system. As a result, the interference in the system can be effectively suppressed with the zero correlation zone property of common codes.

The magnitude of the first and second spreading factors can be dynamically allocated based on different channel conditions and the requirements of the system. For example, the time delay can be ensured to fall in the zero correlation zone of ZCZ sequence used as the channel codes by increasing the first level spreading factor. Further, the number of users in a cell can be enlarged by increasing the first level spreading factor. In this case, if ZCZ sequence is used as the common codes, the number of the common codes being available will be decreased accordingly. By contrast, a larger number of the common codes can also be achieved by decreasing the first level spreading factor and increasing the second level spreading factor.

The present invention has the advantages which are capable of suppressing the interference in the system effectively and enhancing the system performance.

Other features, objectives and advantages of the present invention will become more apparent from the following detailed description of the preferred embodiments thereof with reference to the attached drawings.

DETAILED DESCRIPTION OF THE DRAWINGS

Figure 1:
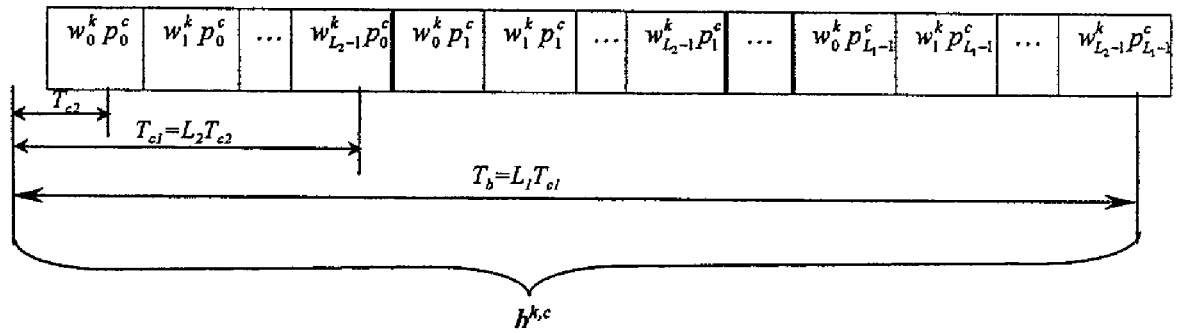
FIG. 1 is a schematic diagram showing a configuration of a two-level spreading chip.
Figure 3:
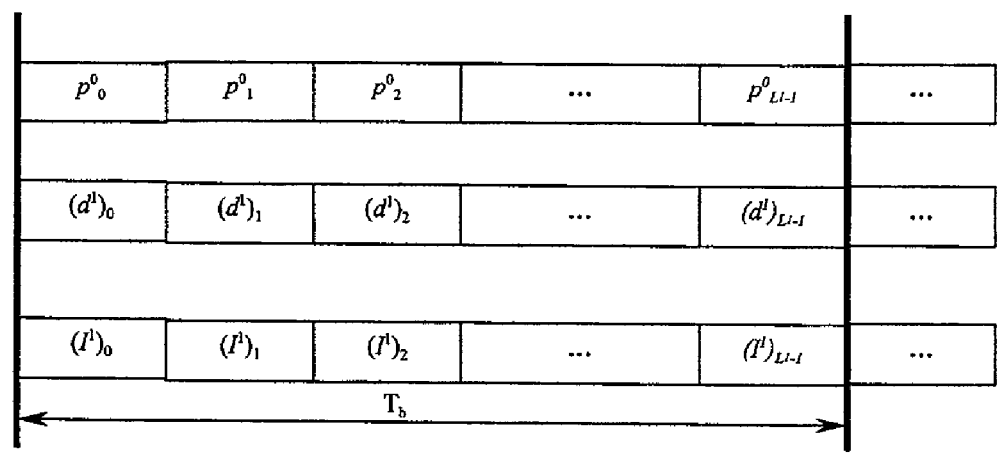
FIG. 3 is a schematic diagram showing a chip after being despread with the common codes.
Figure 2:
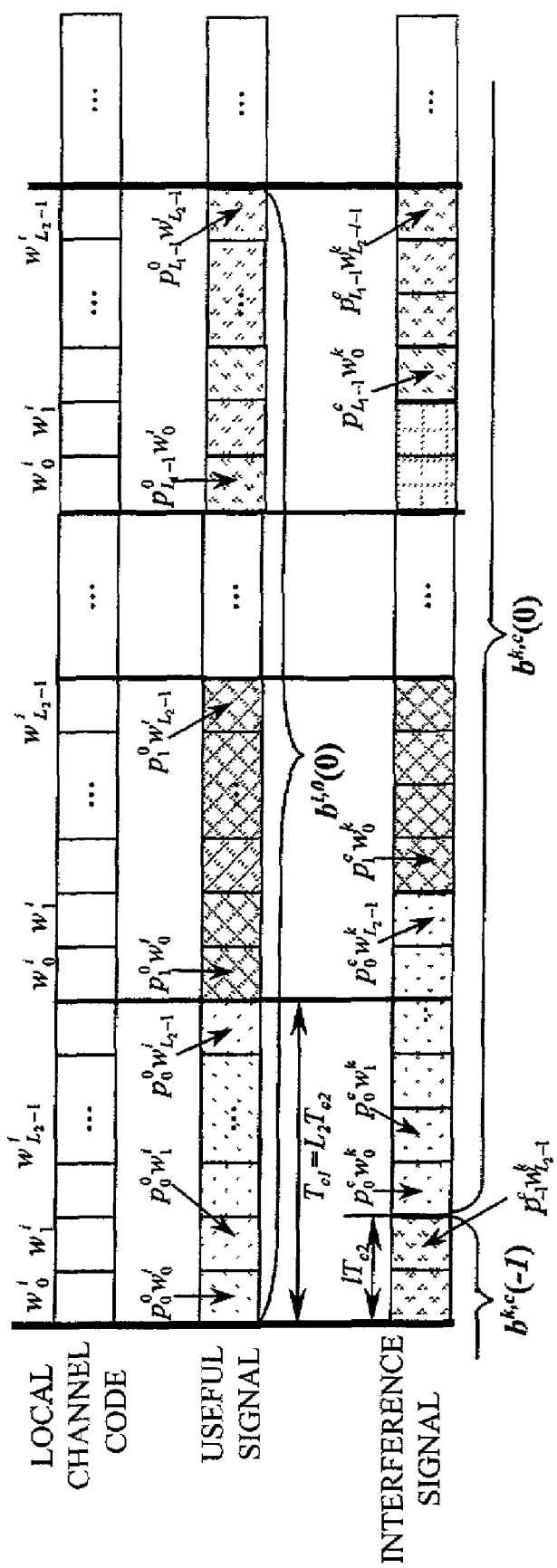
FIG. 2 is a schematic diagram showing a despreading chip of a channel code.

Next, the embodiments of the present invention will be described by referring to the drawings.

Figure 4:
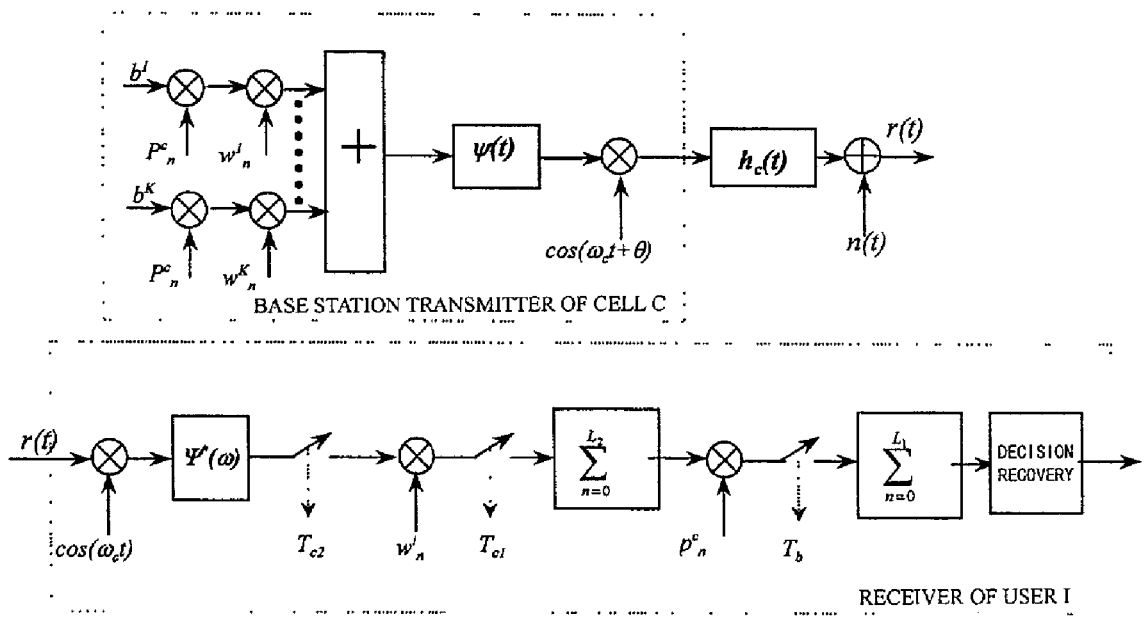
FIG. 4 is a block diagram showing the downlink of the two-level spreading CDMA system.

It is assumed that the kth user in the cth cell uses the common code $p^c$ (it is the same for all the users within a cell) and the channel codes $W^k$ (it is different for the different users within a cell). FIG. 4 shows the models of a transmitter and a receiver, which utilize a two-level variable chip rate spreading method, operating in a downlink. In this Figure, $b^{k,c}$ is the digital information sent by the kth user in cell c, $\psi(t)$ is a chip waveform filter, $\psi^*(\omega)$ is a waveform matched filter, $\omega_c$, is a carrier angle frequency, $h_c(t)$ is a channel impulse response, and r(t) is the signals which is received by the receiver of user i. It should be noted that the system can obtain a required chip rate only after two level spreading is applied to the system, that is, the total spreading gain is the product of the two level spreading gains, whereas the magnitude of each level of the spreading factor can be allocated according to the conditions of the channel and the requirements of the system. When the receiver of the user receives the signals, the carrier is demodulated, then, after passing through the chip waveform matched filter, the signals are sampled periodically at the chip intervals. The channel codes are despread, multiplied by a local channel code $w^i$, then integrated and sampled at the interval of $T_{c1}$, and finally, despread with the common codes. After the signals are multiplied by the local common code $p^c$, they are integrated, and then sampled at the interval of $T_b$. Decision is made as to recover the originally send data information.

Figure 5:
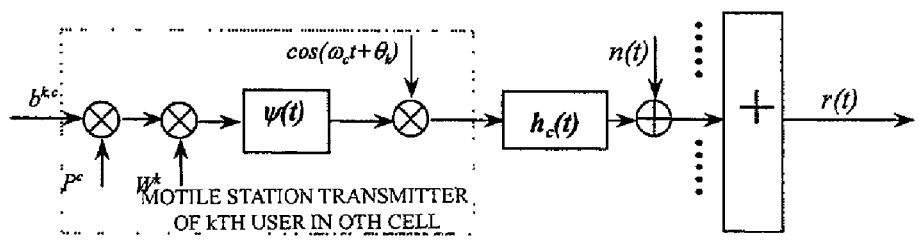
FIG. 5 is a block diagram showing the principle of a transmitter operating in an uplink and channels thereof.

FIG. 5 is a block diagram showing the principle of a transmitter operating in an uplink of the quasi-synchronous system. The information bit $b^{k,c}$ from the mobile station of the kth user in cell c is subjected to first and second level spreading with the common code $p^c$ and the channel codes $W^k$ respectively. The bits are modulated to carrier frequency $\omega^c$ after passing through the chip waveform filter $\psi(t)$ and then transmitted. The signals from different mobile stations are transmitted to the base station through different paths. In a quasi-synchronous system, some measures for synchronization are taken among the users of the same cell and different cells, but it is not necessarily to synchronize accurately, it is allowable to control the synchronous error in a certain range. Thus, as in the downlink, the same common codes can also be used to the uplink users of the cell, and the same channel codes are repeatedly used in different cells. The model of a single receiver finger in an uplink is same as that of a downlink, and both of them are subjected to the two level despreading with the local common code and the channel codes respectively.

In the case where the signals are multipath propagated, RAKE receivers can be used to combine the output from different fingers, each of the firgers can use the despreading method mentioned above. Thus, the interference in the system can be effectively suppressed, and the system performance is greatly enhanced.

The common codes and the channel codes can be selected from any of the following combinations:
(1) ZCZ sequence which the zero correlation zone Z is 1 can be used as the common codes, and then the ZCZ sequence having the corresponding zero correlation zone is used as channel codes;
(2) Walsh sequence can be used as the common codes, and then the ZCZ sequence having the corresponding zero correlation zone is used as channel codes;
(3) ZCZ sequence which the zero correlation zone Z is 1 can be used as the common codes, and then the orthogonal sequence is used as the channel codes;
(4) PN (pseudo-random) sequence can be used as the common codes, and then the ZCZ sequence having the corresponding zero correlation zone is used as the channel codes.

The invention claimed is:

1. A method for two-level variable chip rate spreading and despreading in a CDMA (Code Division Multiple Access) system, the method comprising:
at a transmitting side, applying first level spreading to data information with a first level spreading code to produce a first level-spread signal, wherein the first level spreading code produces a first spreading factor of a chips per symbol interval of the data information, and applying second level spreading to the first level-spread signal with a second level spreading code to produce a second level-spread signal, wherein the second level spreading code produces a second spreading factor of b chips per each chip interval of the first level spreading code, wherein b is more than 1, such that a total spreading factor for producing the second level-spread signal is equal to a product of the first spreading factor and the second spreading factor; and
at a receiving side, first despreading the second level-spread signal, including integrating with a first interval of substantially a chip width of the first level-spread signal, then despreading the first level-spread signal, including integrating with a second interval of substantially a width of an information bit of the data information.

2. The method for two-level variable chip rate spreading and despreading in the CDMA system according to claim 1, wherein the first spreading gain is equal to the length of the first level spreading code, the second spreading gain is equal to a length of the second spreading code.

3. The method for two-level variable chip rate spreading and despreading in CDMA system according to claim 1, wherein in a system which the transmitters of respective base stations are quasi-synchronized, said method applying to the downlinks in CDMA system, said first level spreading code being used as a common code for all users in the same cell to distinguish users of different cells, said second level spreading code being used as the channel codes for each of the users of the cell to distinguish different users of the same cell.

4. The method for two-level variable chip rate spreading and despreading in CDMA system according to claim 1, wherein said method applying to the uplinks of the quasi-synchronized CDMA system, said first level spreading code being used as the common codes for all users in the same cell to distinguish users of different cells, said second level spreading code being used as the channel codes for each of the users of the cell to distinguish different users of the same cell.

5. The method for two-level variable chip rate spreading and despreading in CDMA system according to claims 1, 3 or 4, wherein ZCZ sequence which the zero correlation zone Z is 1 being used as the common codes, ZCZ sequence having the corresponding zero correlation zone being used as the channel codes, and said receiver despreading the common codes and the channel codes respectively.

6. The method for two-level variable chip rate spreading and despreading in CDMA system according to claims 1, 3 or 4, wherein Walsh sequence being used as the common codes, ZCZ sequence having the corresponding zero correlation zone being used as the channel codes, and said receiver despreading the common codes and the channel codes respectively.

7. The method for two-level variable chip rate spreading and despreading in CDMA system according to claims 1, 3 or 4, wherein ZCZ sequence which the zero correlation zone Z is 1 being used as the common codes, the orthogonal sequence being used as the channel codes, and said receiver despreading the common codes and the channel codes respectively.

8. The method for two-level variable chip rate spreading and despreading in CDMA system according to claims 1, 3 or 4, wherein PN (pseudo-random) sequence being used as the common codes, and ZCZ sequence having the corresponding zero correlation zone being used as the channel codes, and said receiver despreading the common codes and the channel codes respectively.

9. The method for two-level variable chip rate spreading and despreading in the CDMA system according to claim 1, further comprising the step of dynamically varying a chip rate of at least one of the first level and the second level spreading codes.

10. A method of applying two-level spreading to an information signal in a CDMA (Code Division Multiple Access) system, wherein the information signal has a length of x symbols, the method comprising:
   applying first level spreading to the information signal with a first level spreading code having a length of y symbols to produce a first level-spread signal having a length of x·y symbols that is greater than x; and
   applying second level spreading to the first level-spread signal with a second level spreading code having a length of z symbols to produce a second level-spread signal having a length of x·y·z symbols that is greater than x·y.

11. The method of claim 10, wherein at least one of the steps of applying the first level spreading and applying the second level spreading includes varying at least one of the lengths y or z dynamically.

12. A method of applying two-level spreading to an information signal in a CDMA (Code Division Multiple Access) system, wherein the information signal has a symbol rate, the method comprising:
   applying first level spreading to the information signal with a first level spreading code used to distinguish different cells, the first level spreading code having a first chip rate equal to the symbol rate times a first level spreading factor to produce a first level-spread signal having a first output symbol rate equal to the first chip rate; and
   applying second level spreading to further spread the first level-spread signal with a second level spreading code used to distinguish channels within a cell, the second level spreading code having a second chip rate equal to the first chip rate times a second level spreading factor to produce a second level-spread signal having second output symbol rate equal to the second chip rate and a spreading factor equal to a product of the first level spreading factor and the second level spreading factor;
   wherein the first level spreading factor is equal to a length of the first level spreading code, and the second level spreading factor is equal to a length of the second level spreading code.

13. The method of claim 12, wherein at least one of the steps of applying the first level spreading and applying the second level spreading includes varying at least one of the first and third chip rates.

* * * * *